O. TOLLAGSEN.
STEAM COOKING DEVICE.
APPLICATION FILED JAN. 6, 1919.

1,375,028.

Patented Apr. 19, 1921.
2 SHEETS—SHEET 1.

Witnesses:
W. F. Kilroy
Harry R. L. White

Inventor:
Olaf Tollagsen,
By Brown Hanson Borton
Attys.

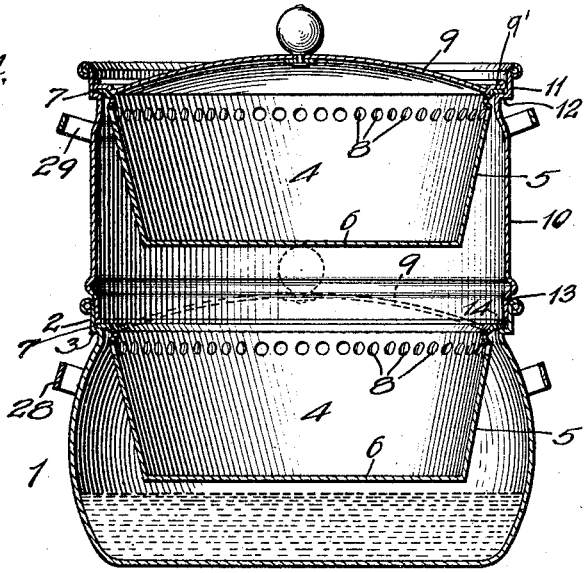
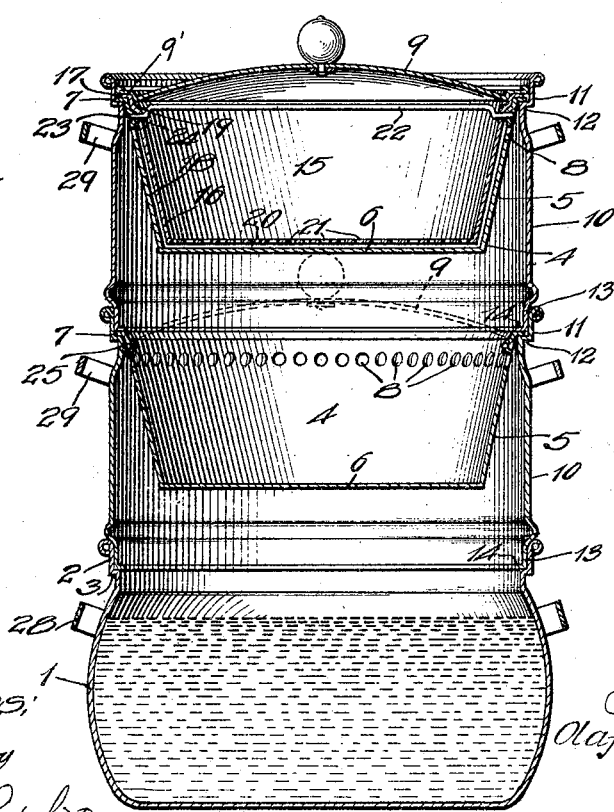

UNITED STATES PATENT OFFICE.

OLAF TOLLAGSEN, OF ST. LOUIS, MISSOURI.

STEAM COOKING DEVICE.

1,375,028.   Specification of Letters Patent.   Patented Apr. 19, 1921.

Application filed January 6, 1919. Serial No. 269,744.

*To all whom it may concern:*

Be it known that I, OLAF TOLLAGSEN, a citizen of the United States, residing at St. Louis, in the county of St. Louis and State of Missouri, have invented a certain new and useful Improvement in Steam Cooking Devices, of which the following is a full, clear, concise, and exact description, reference being had to the accompanying drawings forming a part of this specification.

My invention relates to improvements in cooking utensils and has special reference to cooking devices adapted to cook food by the use of steam.

I have devised an improved combination cooker and steamer whereby I am enabled to cook or prepare either one article or several articles simultaneously, the cooker and its several parts being adapted and fitted for the addition of one compartment above another to the number desired, and by the use of a minimum number of parts.

I preferably make my cooker of aluminum and this metal being relatively expensive, it is part of my object to make the several parts interchangeable and so relate them as to dimensions of retaining flanges, etc., that but one cover is required, which can be used alternately to cover the base pot or kettle or the top with the steamer within, or can be used upon the top of any of the sections which may be arranged above the kettle at the base.

One of my specific objects is to provide a cooking utensil which is capable of being alternately arranged to cook by steam one article or more than one article, in separate vessels, arranged one above the other and which shall be so arranged that when an additional article is to be steamed, an additional section can be added, which section includes an inclosing casing and the vessel or vessels for the article of food. The lid or cover can be changed from the vessel below, to the added section.

In order that those skilled in the art may fully understand my invention, attention is directed to the accompanying drawings, in which:

Fig. 4 is a view similar to Fig. 1, showing another form of my invention; and

Fig. 5 is a vertical central sectional view similar to Fig. 1, showing my device arranged with two of the steamer sections on the base kettle.

Figure 1:
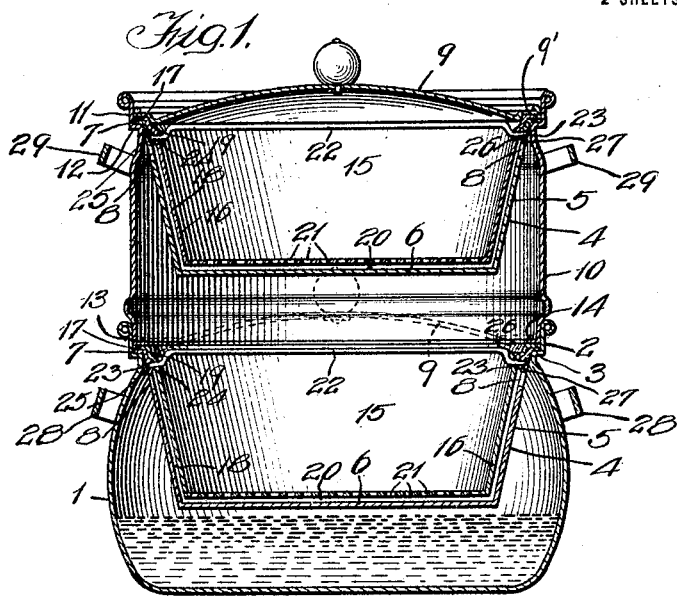
Figure 1 is a central vertical sectional view of my improved steam cooking device shown as arranged for cooking at least two articles of food.

In said drawings, 1 is a main pot or kettle which I provide with a circumferential vertical flange or rim 2 at its top and a substantially horizontal or downwardly inclined inner circumferential flange or shoulder 3 at the bottom of the flange 2. I provide an inner steaming vessel 4 in which I place the food to be cooked by steam. This vessel preferably has a conical side wall 5 to allow ample space surrounding the vessel for steam rising from the water in the lower part of the pot 1. Preferably the water in the vessel does not rise to the bottom 6 of the vessel 4 so as to provide a maximum surface for contact with the steam. For supporting the vessel 4 in position I provide it with an outwardly extending circumferential flange 7 adapted to rest upon and in contact with the shoulder 3 of the vessel 1 and be retained in central position by the vertical flange 2. I thus substantially seal the kettle 1. In use steam is generated from the water in the bottom of the vessel 1 and rises, surrounding the vessel 4, and I provide a circumferential row of holes 8 in the upper part of the vessel 4 just below the supporting flange 7 through which the steam has access to the interior of the vessel 4. It will be understood, of course, that I may use the kettle 1 in which to cook vegetables or other articles which are adapted to be boiled in the water in said vessel, the steam from said boiling rising and effecting the cooking of the articles in the vessels above. I provide a cover 9 with which I cover the vessel 4, as shown in dotted lines, Fig. 1, when I am cooking only one article by steam. For cooking more than one article of food by this steaming process, I provide additional sections, each of which comprise a cylindrical shell 10 having a vertical flange 11 at its upper edge and a horizontal inner circumferential supporting flange 12, both of these being duplicates as to dimensions, of the vertical flange 2 and the horizontal flange 3 at the top of the kettle 1. At the lower end of the shell 10 I provide a circumferential vertical flange 13, terminating in an inwardly projecting narrow circumferential flange 14, this lower end being adapted to fit closely within the vertical flange 2 of the vessel 1 and rest upon the top of the supporting flange of the vessel 4. As the shoulder 12 and vertical flange 11 are duplicates of the shoulder 3 and the vertical flange 2 of the vessel 1, it will now be understood that I can place one of the inner vessels 4 within the shell 10 and in position to be immersed in the steam which will rise from the open top of the lower vessel 4. I make the shell 10 of a suitable height so that the bottom of the upper inner vessel 4 is raised sufficiently above the top of the lower, inner vessel 4, to provide ample space around same for the steam to circulate. I provide the upper vessel 4 with the circumferential row of holes 8 to permit the steam to enter the vessel 4 for completing the steaming process and for the purpose of permitting it to rise into and through additional vessels 4 which may be arranged above. I close the device by means of the cover 9. This cover or lid, which is provided with a suitable handle, preferably has its center portion crowned up and is provided with a circumferential flange 9' which is adapted to fit within either the flange 11 as shown in full lines, or within the flange 2 as shown in dotted lines.

The flange 9' of the cover 9 is adapted to rest upon the flange of one of the inner vessels 4 and close same, or upon the shoulder 3 of the kettle 1 when the vessel 4 is removed.

In one form of my device, as illustrated in Fig. 4, I make use of the inner vessels 4 in both the kettle and in the shell 10 above, but I prefer to more effectively apply the steam to the articles of food to be cooked thereby, and for this purpose, as shown in Fig. 1, I provide an inner steaming vessel 15 for containing the food. This inner vessel 15 is shaped similar to the vessel 4 in that it has a conical side wall 16 terminating in a circumferential radial flange 17 at its upper edge, by which it is supported within the vessel 4. The side wall of this inner vessel 15 is spaced from the side wall of the vessel 4, forming an annular steam space 18 around same. For this purpose I flare the upper part 19 of the side wall 16 outwardly to fit snugly within the upper part of the vessel 4. I make this inner vessel 15 slightly shallower than the vessel 4 so as to provide a steam space 20 below same, and I provide it with a plurality of small holes 21 in its bottom, through which the steam can rise into the interior of the vessel 15 and through this vessel to the next section above and so on throughout the whole series of sections employed.

When I use the inner vessel 15 I place the food to be cooked by steam therein and I distribute the steam throughout the whole volume of this inner vessel 15 by means of the perforated bottom as described.

Figure 2:
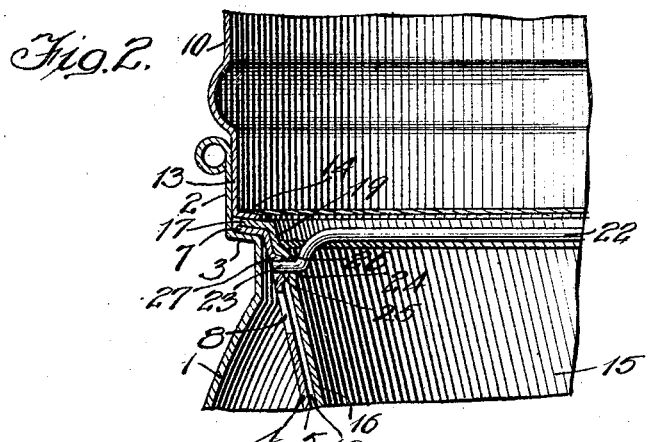
Fig. 2 is an enlarged fragmentary section particularly illustrating the means for interlocking the two inner vessels.
Figure 3:
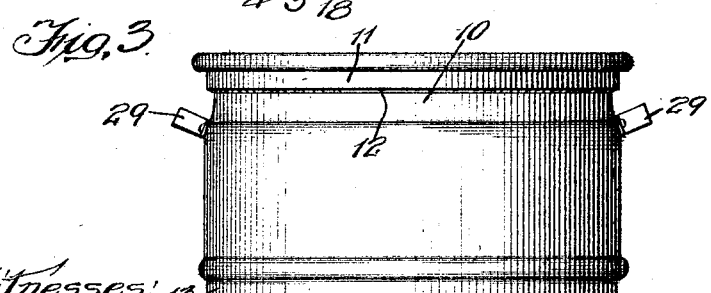
Fig. 3 is a side elevation of one of the upper sections.

For lifting the inner vessels or pans 4 and 15 I provide a wire bail 22 adapted to lie within the enlarged top of the vessel 15, as shown in Fig. 2, and having its ends 23 bent outwardly to enter holes 24 and 25 which I provide in the walls of the vessels 15 and 4.

I preferably provide the two inner vessels with pressed or formed in rounded projections 26 and 27 at each side. The projections 27 of the vessel 4 enter the depressions formed in the wall of the vessel 15 by the formation of the projections 26 and thus separably interlock the two together. The walls of the two vessels can give sufficiently to provide for this engagement. This form of interlock serves the additional purpose of registering the holes 24 and 25 for receiving the bail 22, as I make the holes in the centers of said projections, and furthermore the depression thus formed in the wall of the vessel 4 provides space in which the end 23 of the bail 22 can project and yet permit the free removal of the inner vessel from the kettle 1 or the section 10. When it is desired to separate the vessels 4 and 15 it is merely necessary to spring the bail inwardly out of the holes 24 and 25 and then pull the vessels 4 and 15 apart.

For convenience in lifting the several vessels I provide the kettle 1 with handles 28 at opposite points and near its top, and I provide the shell 10 with handles 29 similar to the handles 28 for lifting same.

In Fig. 1 I have illustrated the device as being built up of the pot 1 and one additional section 10, but it will be obvious that I can as readily build it up with additional sections to any height desired and steam therein as many additional articles of food as I provide sections, the steam rising from one vessel around and through the next higher, through the whole series, and in Fig. 5 I have illustrated a cooker built up of a base pot 1 and two of the sections 10. It will be seen that the several parts are not only registered in alinement with each other by the coöperating flanges, but the several sections are retained in position and held against accidental lateral displacement thereby.

It is also apparent that no matter whether I use the kettle 1 alone or additional sections, I need but one cover, as this one cover is usable interchangeably to cover the kettle 1 or to cover any of the sections.

Each section above the kettle is a complete unit except for the cover and they can be interchanged as to height to control the cooking of the articles which they contain, also the inner vessels are all duplicates of each other and can be readily changed from a position within the kettle to a position in a shell above or vice versa, if such a change is desirable in the process of cooking. As the bottom of each shell is received within the top of the kettle or the shell below, any condensation or drip which may be formed will all drain back into the kettle 1 or into the lower vessel 4, and will not run down the outside of the device.

My improved cooker is particularly adapted for the steaming of articles of food, such as certain kinds of puddings, which require to be steamed for many hours. For this purpose I remove the inner vessels from the kettle 1 so that I can nearly fill the same with water as shown in Fig. 5. This quantity of water is sufficient to provide steam for many hours cooking. In said figure I illustrate the possibility of using one of the inner vessels 4 in one section without the second inner vessel 15 and also the use in the top section 10 of both the inner vessels 4 and 15. The arrangement shown in this figure illustrates the great adaptability of my sectional steamer to meet different needs.

As it is obvious that many modifications of my invention will readily suggest themselves to those skilled in the art, I do not limit or confine my invention to the specific structures and arrangements herein shown and described, except within the scope of the appended claims.

I claim:

1. In a multiple compartment steam cooking device, the combination of a base kettle, the upper margin of which is formed with an annular shoulder and a vertical annular flange surrounding said shoulder, a pair of coöperating steaming vessels adapted for support in said base kettle, said coöperating steaming vessels being adapted for cooking solid, semi-liquid, or liquid foods by permeating steam upwardly through the same and comprising an outer steaming vessel for placement within said base kettle, said outer steaming vessel having an annular external flange on its upper margin adapted to rest upon said annular shoulder, the side wall of said outer vessel having steam inlet holes adjacent said external flange, an inner steaming vessel provided with a similar annular external flange seating upon the external flange of said outer vessel, the bottom of said inner vessel having steam circulating holes therein and the bottom of said outer vessel being imperforate, the walls of said inner vessel being spaced from said outer vessel to permit the steam entering through the steam inlet holes in the latter to flow downwardly between said vessels and up through the holes in the bottom of said inner vessel and through the food contained therein, a cylindrical shell seating within the vertical annular flange of said base kettle and above the external flanges of said coöperating steaming vessel, the upper margin of said shell being formed with an annular shoulder and a vertical annular flange surrounding said shoulder in duplicate of the margin of said base kettle, both ends of said shell being entirely open, and a second pair of coöperating steaming vessels supported on the annular shoulder of said shell, said second pair of coöperating steaming vessels being in duplicate of said first pair whereby the steam from said base kettle permeates upwardly through the food in said first pair of steaming vessels and thence passes upwardly and permeates through the food in said second pair of steaming vessels.

2. In a device of the kind described, two sheet metal vessels adapted to fit one within the other, and having the upper parts of their side walls substantially in contact, coöperating interlocking projections and depressions formed in said contacting walls, said side walls being provided with registering holes which are caused to register by the engagement of said depressions and projections, and a wire bail having ends passing through said holes.

3. In a device of the kind described, two sheet metal vessels adapted to fit one within the other, and having the upper part of the side wall of the inner vessel flared outwardly into contact with the side wall of the outer vessel, thereby forming a shallow groove around the mouth of the inner vessel, coöperating inwardly extending interlocking projections and depressions formed in said contacting walls, said side walls being provided with holes adapted to be registered with each other by the engagement of said projections and depressions, and a wire bail adapted to lie within the groove in the upper part of the inner vessel and having its ends bent outwardly to project through said holes.

4. In a device of the kind described, two sheet metal vessels adapted to fit one within the other, the inner vessel having its upper part flared outwardly to contact with the wall of the outer vessel, diametrically opposed inwardly extending projections formed in the wall of the inner vessel within the contacting area, providing depressions in the outer surface and like projections formed in the wall of the outer vessel adapted to engage in said depressions, the walls of said vessels being provided with registering openings in the centers of said projections, and a bail adapted to lie within the upper part of the inner vessel and having its ends bent outwardly and adapted to project through said openings, said depressions forming spaces to receive the ends of said bail.

In witness whereof, I hereunto subscribe my name this 3d day of January, A. D. 1919.

OLAF TOLLAGSEN.